United States Patent Office 3,527,639

Patented Sept. 8, 1970

3,527,639

LIGHT-SENSITIVE COMPOSITION UTILIZING ANTHRAQUINONE DERIVATIVES AS OPTICAL SENSITIZERS

Roland Moraw, Wiesbaden-Biebrich, Germany, assignor to Kalle Aktiengesellschaft, Wiesbaden - Biebrich, Germany

No Drawing. Filed Sept. 28, 1966, Ser. No. 582,523
Claims priority, application Germany, Sept. 30, 1965, K 57,271
Int. Cl. G03c *1/52*
U.S. Cl. 96—90 6 Claims

ABSTRACT OF THE DISCLOSURE

Light-sensitive reproduction material of the type which includes a color former reactive in the presence of a free radical to provide a color forming body, and a compound which splits off a halogen free radical when exposed to light yields improved reproductions at high photographic speeds when the color former is an N-vinyl compound and the material includes a sensitizer selected from the group of compounds formed by the substitution of anthraquinone with chlorine, amino, methyl or nitro groups.

The invention described herein relates to reproduction material comprising a support and a light-sensitive layer disposed thereon, which layer consists of at least one compound which splits off halogen when exposed to light, at least one N-vinyl compound and at least one sensitizer. The invention relates, in particular, to new sensitizers.

Light-sensitive reproduction materials of the kind defined are known. For example, U.S. Pat. No. 3,042,517 describes copying material in which the light-sensitive layer contains as essential constituents a halogenated hydrocarbon that splits off halogen when exposed to light, preferably carbon tetrabromide, an N-vinyl compound, preferably N-vinyl carbazole, and a film-forming substance.

Arylamines, sulphur compounds, plasticizers and sensitizers for visible and ultraviolet light may be present in the layer. The first-mentioned additives act as stabilizers which prevent undesired formation of dyestuff in the dark or which prevent fogging in the unexposed portion of the copying material. As in all photographic materials, the sensitizers are used to increase the sensitivity to light and thus shorten the time required for exposure. When the material is exposed to light the free halogen radicals that are formed react with the N-vinyl compound or the arylamine to form a dyestuff, this process being common to all copying materials of this kind. Exposure to light thus produces a negative image of the master. The image obtained is generally very weak and it has to be intensified and fixed by the action of heat. This material can also be used in the thermographic copying process provided its whole surface area is irradiated with ultraviolet light prior to heating.

Sensitizers for the above-described systems have previously been suggested and include N,N-dimethylphenylazoaniline for visible light and benzil, benzoin, stilbene derivatives, phenylsalicylate and benzophenone derivatives for ultraviolet light.

The purpose of this invention was to provide improved sensitizers for reproduction materials in which the layers consist essentially of a compound which splits off halogen when exposed to light, preferably carbon tetrabromide, and at least one N-vinyl compound, preferably N-vinylcarbazole.

Accordingly, this invention is based on the observation that reproduction materials of the kind defined display increased sensitivity to light when the layer contains as sensitizer 0.5 to 20 percent by weight, but preferably 1 to 10 percent by weight, based on the content of N-vinyl compound, of one or more mono-substitution products or disubstitution products of anthraquinone, suitable substituents being chlorine and amino, methyl and nitro groups; which substituents may be identical with each other or different from each other.

Suitable sensitizers are, inter alia, 1-chloroanthraquinone, 2-chloroanthraquinone, 1,4-dichloroanthraquinone, 1,5 - dichloroanthraquinone, 1,8 - dichloroanthraquinone, 2,7 - dichloroanthraquinone, 1-chloro-2-amino-anthraquinone, 1-chloro-2-methylanthraquinone, 1,5-dinitroanthraquinone and 4-nitro-1-aminoanthraquinone. By using an adequate amount of sensitizer within the limits indicated it is possible in practically all cases to more than double the degree of sensitivity, and in some cases it is even possible to increase it fivefold.

The sensitivity to light of the present color-forming systems, especially the N-vinyl compound/tetrabromomethane system, is extended towards the longer wavelength region by the anthraquinones. A layer consisting of N-vinylcarbazole and tetrabromomethane is sensitive to light up to about 4600 AU, whereas sensitization with 1,8-dichloroanthraquinone, for example, extends the range into yellowish green at about 5700 AU. Although the mode of action of the sensitizers of the invention is not yet fully understood, it is assumed that the extension of the sensitivity to light into the visible range of the spectrum is brought about by the anthraquinones entering into complex formation with the other components of the light-sensitive layer.

It is interesting to note that the addition of a binder to a layer prepared in accordance with the invention in many cases completely neutralizes the power of the sensitizers to accelerate the formation of dyestuff.

The methods by which the materials of the invention are manufactured and processed are no different from those used for known materials. The components are dissolved in the customary manner, applied to a suitable support and dried; when required for use the material is exposed to light and the image is intensified and fixed by heat. As is normally the case, the support used is preferably paper, and it must not be too absorbent in order that the coating does not penetrate too deeply into it when applied.

The following example illustrates the invention:

EXAMPLE

A number of different coating solutions were prepared and applied to paper. Each solution contained 10 grams of N-vinyl-carbazole and 10 grams of carbon tetrabromide in 100 grams of acetone. 1 gram of sensitizer was then added to each solution. The various sensitizers used are indicated in the following table. The solutions were applied to paper by a common coating process and the acetone was evaporated by means of air. The various specimens of copying material so prepared were exposed beneath a glass plate and a master to the light of a 200 watt incandescent lamp which was placed at a distance of 30 cm. from the copying material. Subsequently, the exposed material was subjected to a temperature of 100°

C. for a period of 3 minutes. In all cases, the time of exposure was such that maximum contrast was achieved. The following table indicates the time of exposure, in seconds, required for the various specimens of copying material.

TABLE

| Sensitizers: [1] | Time of exposure |
|---|---|
| None | 30 |
| 1-chloro | 10 |
| 2-chloro | 15 |
| 1,4-dichloro | 10 |
| 1,5-dichloro | 7.5 |
| 1,8-dichloro | 5.1 |
| 2,7-dichloro | 10 |
| 1-chloro, 2-amino | 5.1 |
| 1-chloro, 2-methyl | 10 |
| 1,5-dinitro | 15 |
| 4-nitro, 1-amino | 5.1 |

[1] Substitution products of anthraquinone, numbering being as follows:

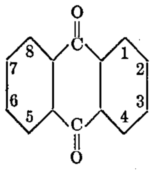

Only minimal deviations from the above figures are obtained when carbon tetrabromide is replaced by the same amount of meta-nitrotribromoacetophenone or 2,5-dimethyltribromoacetophenone.

Furthermore, no significant change in conditions is brought about by the use of the customary additives that prevent fogging and that prolong the storage life of the material.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Light-sensitive reproduction material comprising a support and a coating thereon comprising:

an N-vinyl compound;

an organic halogen compound which splits off halogen when exposed to light; and a sensitizer selected from the group of compounds formed by the substitution of anthraquinone at one or two ring positions with substituents selected from the group consisting of chlorine, amino, methyl and nitro groups.

2. Material according to claim 1 wherein said organic halogen compound is selected from the group consisting of carbon tetrabromide, meta-nitrotribromoacetophenone, and 2,5-dimethyltribromoacetophenone.

3. Material according to claim 1 wherein said N-vinyl compound is N-vinyl carbazole.

4. Material according to claim 1 wherein said sensitizer is present in an amount between about 0.5 to 20 percent by weight of said N-vinyl compound.

5. Material according to claim 1 wherein said sensitizer is present in an amount between about 1.0 to 10 percent by weight of said N-vinyl compound.

6. Material according to claim 4 wherein said sensitizer is selected from the group consisting of 1-chloro-; 2-chloro-; 1,4-dichloro-; 1,5-dichloro; 1,8-dichloro; 2,7-dichloro; 1-chloro-2-amino; 1-chloro-2-methyl; 1,5-dinitro; and 4-nitro-1-aminoanthraquinone.

References Cited

UNITED STATES PATENTS

| | | | |
|---|---|---|---|
| 2,281,895 | 5/1942 | Von Poser et al. | 96—90 |
| 2,865,752 | 12/1958 | Saunders et al. | 96—102 |
| 3,042,517 | 7/1962 | Wainer et al. | 96—90 |

NORMAN G. TORCHIN, Primary Examiner

W. H. LOUIE, Jr., Assistant Examiner

U.S. Cl. X.R.

96—102